United States Patent
Bitra et al.

(10) Patent No.: US 10,082,579 B2
(45) Date of Patent: Sep. 25, 2018

(54) NETWORK AWARE SATELLITE POSITIONING SYSTEM ASSISTANCE INFORMATION TRANSFER

(71) Applicant: QUALCOMM Incorporated, San Diego, CA (US)

(72) Inventors: Suresh Kumar Bitra, Mangalagiri (IN); Mahadevan Srinivasan, San Diego, CA (US); Vivek Sankaravadivel, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 543 days.

(21) Appl. No.: 15/099,406

(22) Filed: Apr. 14, 2016

(65) Prior Publication Data

US 2017/0299725 A1    Oct. 19, 2017

(51) Int. Cl.
| | |
|---|---|
| *G01S 19/05* | (2010.01) |
| *G01S 19/25* | (2010.01) |
| *G01S 19/07* | (2010.01) |
| *H04W 84/04* | (2009.01) |
| *H04W 4/80* | (2018.01) |

(52) U.S. Cl.
CPC .............. *G01S 19/07* (2013.01); *G01S 19/05* (2013.01); *H04W 4/80* (2018.02); *H04W 84/04* (2013.01)

(58) Field of Classification Search
CPC .................................. G01S 19/05; G01S 19/06
USPC .............. 342/357.4, 357.42, 357.43, 357.64; 701/468, 473
See application file for complete search history.

(56) References Cited

U.S. PATENT DOCUMENTS

| | | |
|---|---|---|
| 2007/0225016 A1 | 9/2007 | Jendbro et al. |
| 2011/0032146 A1 | 2/2011 | Halivaara et al. |
| 2011/0237185 A1 | 9/2011 | Murray et al. |
| 2011/0269478 A1 | 11/2011 | Das et al. |
| 2013/0122929 A1 | 5/2013 | Al-Mufti et al. |
| 2015/0208332 A1 | 7/2015 | Baghel et al. |

FOREIGN PATENT DOCUMENTS

| | | |
|---|---|---|
| CN | 103969670 A | 8/2014 |
| WO | 0103344 A1 | 1/2001 |
| WO | 2007094708 A1 | 8/2007 |
| WO | 2014168537 A1 | 10/2014 |

OTHER PUBLICATIONS

International Search Report and Written Opinion—PCT/US2017/022114—ISA/EPO—dated Jun. 6, 2017.

*Primary Examiner* — Dao L Phan
(74) *Attorney, Agent, or Firm* — Silicon Valley Patent Group LLP

(57) ABSTRACT

In some embodiments, Satellite Positioning System (SPS) time information associated with at least one SPS may be maintained at a UE, which may also receive time information from a Wireless Wide Area Network (WWAN). In some embodiments, the UE may determine a corrected SPS time information for a first time based, in part, on the received WWAN time information, where the corrected SPS time information corrects the SPS time information associated with the at least one SPS maintained at the UE. The UE may initiate transmission of SPS timing assistance information to an associated device over a Wireless Personal Area Network (WPAN), wherein the SPS timing assistance information comprises the corrected SPS time information for the first time.

30 Claims, 7 Drawing Sheets

NETWORK AWARE SATELLITE POSITIONING SYSTEM ASSISTANCE INFORMATION TRANSFER

FIELD

The subject matter disclosed herein relates to positioning and specifically, to the transfer of timing assistance information related to satellite positioning between proximate networked devices.

BACKGROUND

It is often desirable to perform positioning functions on user equipment (UE) such as a wearable device, mobile terminal, a cellular phone or other mobile device. The terms "location" and "position" are synonymous and are used interchangeably herein. For example, a wearable device may have Satellite Positioning System (SPS) functionality, but maybe unable to receive assistance information to facilitate SPS utilization because the wearable device may lack Wireless Wide Area Network (WWAN). Without assistance information, the wearable device in the example above may expend valuable battery power and take additional time to determine a position of the device/user. Therefore, there is a need for apparatus, systems and methods to facilitate the utilization of positioning functions.

SUMMARY

In some embodiments, a method may comprise: maintaining, at a UE, a Satellite Positioning System (SPS) time information associated with at least one SPS; receiving, at the UE, a Wireless Wide Area Network (WWAN) time information corresponding to a WWAN; determining a corrected SPS time information for a first time based, in part, on the WWAN time information, the corrected SPS time information to correct the maintained SPS time information associated with the at least one SPS; and initiating transmission of SPS timing assistance information to an associated device over a Wireless Personal Area Network (WPAN), wherein the SPS timing assistance information comprises the corrected SPS time information for the first time.

In another aspect, User Equipment (UE) may comprise: a Satellite Positioning System (SPS) receiver, the SPS receiver to receive a Satellite Positioning System (SPS) time information associated with at least one SPS; a transceiver, the transceiver to receive, a Wireless Wide Area Network (WWAN) time information corresponding to a WWAN; and a processor coupled to the SPS receiver and the transceiver. In some embodiments, the processor may be configured to: maintain the Satellite Positioning System (SPS) time information; determine a corrected SPS time information for a first time based, in part, on the WWAN time information, the corrected SPS time information to correct the maintained SPS time information associated with the at least one SPS; and initiate transmission of SPS timing assistance information to an associated device over a Wireless Personal Area Network (WPAN), wherein the SPS timing assistance information comprises the corrected SPS time information for the first time.

In a further aspect, a User Equipment (UE) may comprise: Satellite Positioning System (SPS) receiving means to receive a Satellite Positioning System (SPS) time information associated with at least one SPS; transceiver means to receive, a Wireless Wide Area Network (WWAN) time information corresponding to a WWAN; means for maintaining the Satellite Positioning System (SPS) time information; means for determining a corrected SPS time information for a first time based, in part, on the WWAN time information, the corrected SPS time information to correct the maintained SPS time information associated with the at least one SPS; and means for initiating transmission of SPS timing assistance information to an associated device over a Wireless Personal Area Network (WPAN), wherein the SPS timing assistance information comprises the corrected SPS time information for the first time.

In some embodiments, a non-transitory computer-readable medium may comprise instructions that are executable by a processor to: maintain, at a UE, a Satellite Positioning System (SPS) time information associated with at least one SPS; receive, at the UE, a Wireless Wide Area Network (WWAN) time information corresponding to a WWAN; determine a corrected SPS time information for a first time based, in part, on the WWAN time information, the corrected SPS time information to correct the maintained SPS time information associated with the at least one SPS; and initiate transmission of SPS timing assistance information to an associated device over a Wireless Personal Area Network (WPAN), wherein the SPS timing assistance information comprises the corrected SPS time information for the first time.

The methods disclosed may be performed by one or more of servers (including location servers), UEs, etc. using various protocols. Embodiments disclosed also relate to software, firmware, and program instructions created, stored, accessed, read or modified by processors using non-transitory computer readable media or computer readable memory.

BRIEF DESCRIPTION OF THE DRAWINGS

Embodiments of the invention will be described, by way of example only, with reference to the drawings.

DETAILED DESCRIPTION

Figure 1:
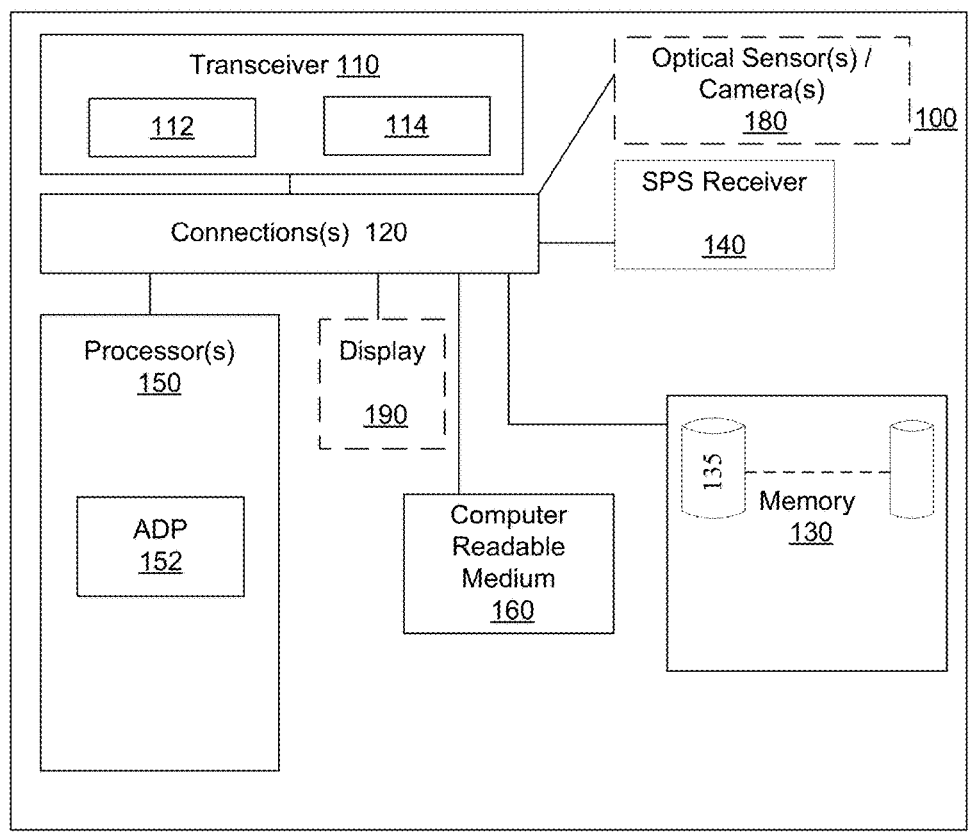
FIG. 1 shows a schematic block diagram illustrating certain exemplary features of a UE 100 enabled to support network aware SPS assistance information transfer in accordance with certain embodiments presented herein.

Disclosed embodiments facilitate positioning by the transfer of SPS and/or location assistance information to proximate devices. For example, satellite based positioning may be facilitated by SPS assistance data including time and reference frequency assistance, which may be used by a positioning device to reduce the Time To First Fix (TTFF). SPS assistance data may be provided to some UEs via a Wireless Wide Area Network (WWAN), which may take the form of a cellular network.

For some user devices with SPS functionality but lacking WWAN availability, maintaining SPS time accurately may present challenges because of local clock drift on the user devices. WWAN based clocks as reflected in signals transmitted by corresponding WWANs may offer greater accuracy and suffer lower clock drift relative to SPS time. In some embodiments, when a first device lacks WWAN functionality and/or indicates that WWAN functionality is unavailable and/or indicates that SPS timing assistance is desired, then, then SPS timing assistance may be provided and/or relayed to the first device by a second proximate device. SPS timing assistance information may include satellite clock and/or reference time information, and may also include corrected SPS time, and/or information that may be used to correct SPS time (e.g. by the first/receiving device). The term "corrected SPS time", as used herein, may refer to: (i) a new or corrected SPS time ($SPS_C$) obtained by applying a correction ($\Delta T_{SPS}$) to a SPS time ($SPS_M$) maintained at a device, where $SPS_C=SPS_M+\Delta T_{SPS}$, and/or (ii) to SPS correction information ($\Delta T_{SPS}$) that may be used to correct a SPS time ($SPS_M$) maintained at a device. Thus, using the notation above, the term "corrected SPS time" may refer to $SPS_C$ and/or to $\Delta T_{SPS}$ and SPS timing assistance information may include "corrected SPS time." In some embodiments, the SPS timing assistance provided and/or relayed by the second device to the first device may be based, in part, on information provided by a WWAN. The information provided by the WWAN may include WWAN timing information and the SPS timing assistance information may be based, in part, on the WWAN timing information.

Proximate devices receiving SPS timing assistance information from a second device may observe a reduction in the TTFF thereby facilitating quicker positioning, reduced power consumption, and conservation of battery resources. In some embodiments, the SPS timing assistance information may be conveyed by the second device over a Wireless Personal Area Network (WPAN). A WPAN may be a network based on the IEEE 802.15x standards, or some other type of network. For example, a WPAN may take the form of a Bluetooth and/or a Near Field Communication (NFC) network. In some embodiments, a WPAN may be implemented using peer-to-peer (P2P) communication between proximate devices. In some embodiments, the WPAN may be implemented using a proprietary wireless interface that facilitates low level communication between the proximate devices. For example, a low power application processor may be used to implement and/or facilitate communications between two or more proximate devices (e.g. over a WPAN). In some embodiments, the low power application processor may facilitate fast communication between proximate devices, in part, by mitigation of operating system and other overheads associated with the communication.

In some embodiments, the WWAN timing information obtained by the second device from the WWAN may be corrected or otherwise adjusted to account for communication delays between the first and second devices. The SPS timing assistance information may be provided by the second device to a first device: periodically, upon request, or as part of (or following) a synchronization protocol between the first and second devices. In some embodiments, the SPS timing assistance information may be provided when the first device is powered up, and/or wakes from a sleep or idle state.

The term "network awareness" is used to refer to a determination or awareness that: (i) one or more first devices and a second device are communicatively coupled wirelessly (e.g. over a WPAN); (ii) that timing information is available over a WWAN network accessible to the second device; and (iii) access to the WWAN network (or access to timing information from the WWAN network) is unavailable to the one or more first devices. Accordingly, the term "network aware timing assistance information transfer" is used to refer to the transfer of SPS assistance information including as SPS timing assistance information from the second device to one or more first devices upon a determination that: (i) one or more first devices and a second device are communicatively coupled wirelessly (e.g. over a WPAN); (ii) that timing information is available over a WWAN network accessible to the second device; and (iii) access to the WWAN network (or access to timing information from the WWAN network) is unavailable to the one or more first devices. In some embodiments, the SPS timing assistance information may be based, in part, on the timing information obtained over the WWAN.

The terms "user equipment" (UE) or "mobile station" (MS), may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms UE, "mobile station" or "target" are intended to include all devices, including wireless and wireline communication devices, computers, laptops, etc. which are capable of communication with a server, such as via the Internet, WiFi, cellular wireless network, DSL network, packet cable network or other network, and regardless of whether satellite signal reception, assistance data reception, and/or position-related processing occurs at the device, at a server, or at another device associated with the network. Any operable combination of the above are also considered UEs.

FIG. 1 shows a schematic block diagram illustrating certain exemplary features of UE 100 enabled to support network aware SPS assistance information transfer in accordance with certain embodiments presented herein. SPS assistance information may include satellite orbit assistance data such as ephemeris and almanac data, SPS timing assistance information, and satellite transmission frequency information.

In some embodiments, SPS assistance information transfer from UE 100-$i$ to one or more associated UEs 100-$j$ ($i \neq j$) or other devices (not shown in FIG. 1), may be triggered based on conditions associated with a first network (e.g. WWAN) including: (i) the accessibility of the first network to associated devices/UEs 100-$j$; and (ii) the availability of appropriate timing information on the first network. For example, UEs 100-$i$ and 100-$j$ ($i \neq j$) may be associated over second network (e.g. WPAN) and the transfer of timing assistance information may occur over the second network.

UE 100 may, for example, include one or more processing units or processor(s) 150, memory 130, and a transceiver 110 (e.g., wireless network interface) comprising transmitter 112 and receiver 114. In some embodiments, UE 100 may include a Global Navigation Satellite System (GNSS) or Satellite Positioning System (SPS) receiver 140 (hereinafter "SPS receiver 140"). SPS receiver 140 may be enabled to receive signals associated with one or more SPS/GNSS resources. Received GNSS signals may be used to determine a position of UE 100. In some embodiments, UE 100 may optionally further include one or more of: optical sensors/camera(s) 180 and/or display 190.

Transceiver 110 may, for example, include a transmitter 112 enabled to transmit one or more signals over one or more types of wireless communication networks and a receiver 114 to receive one or more signals transmitted over one or more types of wireless communication networks. For example, transceiver 110 may be capable of processing signals associated with one or more of a WWAN, and/or a WLAN, and/or a WPAN. Signals processed by transceiver 110 may be provided to processor(s) 150 and other functional components in UE 100.

Processor(s) 150 may be implemented using a combination of hardware, firmware, and software. Processor(s) 150 may initiate communication and/or association with one or more networks and/or other devices (including other UEs) using functionality provided by transceiver 110. In some embodiments, processor(s) 150 may receive and process signals measured by SPS receiver 140 to determine a position of UE 100. In some embodiments, processor(s) 150 may determine network conditions such as availability of SPS assistance and/or WWAN timing information on a network associated with UE 100.

In some embodiments, processor(s) 150 may include Assistance Data Processor (ADP) 152, which may support network aware timing assistance information transfer. In some embodiments, processor(s) 150 and/or ADP 152 may obtain various types of assistance information, including location assistance and/or SPS assistance information using terrestrial systems. For example, timing information, location assistance information, and/or SPS assistance information may be provided through a WWAN. In some embodiments, UE 100, processor(s) 150 and/or ADP 152 may derive a portion of SPS assistance information, including SPS timing assistance information, based on signals transmitted by a WWAN. In some embodiments, processor(s) 150 and/or Assistance Data Processor 152 (hereinafter ADP 152) use the received assistance information to facilitate satellite acquisition and positioning determination.

In some embodiments, processor(s) 150 and/or ADP 152 may receive satellite orbit assistance data such as ephemeris and almanac data, satellite clock and/or reference time information, satellite transmission frequency information. In some embodiments, the SPS assistance data received by UE 100 may be based on an estimated position of UE 100. For example, the location of a Base Station (BS) in communication with UE 100 over a WWAN may be used as a coarse estimate of the location of UE 100. In general, various techniques for estimating and/or refining a location of UE 100 may be used. For example, various techniques such as Advanced Forward Link Trilateralation (AFLT), Round Trip Time (RTT) measurements, Reference Signal Time Difference (RSTD). Observed Time Difference of Arrival (OTDOA), hybrid SPS-AFLT techniques, Wireless Local Area Network (WLAN) based positioning, hybrid sensor-wireless techniques, etc. may be used to estimate a location of UE 100.

In some embodiments, processor(s) 150 and/or ADP 152 may determine SPS timing assistance information (which includes corrected SPS time) based on time information received over a WWAN. The SPS timing assistance information may be used by a UE 100-$i$ and/or transmitted to an associated device/UE 100-$j$ ($i \neq j$), as SPS timing assistance information. In some embodiments, the SPS timing assistance information may be used by receiving UE 100-$j$ to reduce clock uncertainty thereby reducing the TTFF. For example, cellular (WWAN) base stations may provide timing information to UE 100-$i$, which may be used to derive SPS timing assistance information. In some embodiments, processor(s) 150 and/or ADP 152 may process the received WWAN timing information to obtain SPS timing assistance information. The SPS timing assistance information may be transmitted by UE 100-$i$ to an associated device/UE 100-$j$ ($i \neq j$) over a WPAN.

In some embodiments, processor(s) 150 and ADP 152 may also be capable of processing various other received signals such as Long Term Evolution (LTE) Positioning Protocol (LPP) or LPP extensions (LPPe) messages, which may include assistance information either directly and/or in conjunction with one or more other functional blocks shown in FIG. 1.

In some embodiments, processor(s) 150 on a UE 100-$i$ may initiate communication with one or more other devices/UEs 100-$j$ ($i \neq j$). For example, processor(s) 150 may initiate communication with over a Wireless Personal Area Network (WPAN) with a proximate device. In some embodiments, processor(s) 150 and/or ADP 152 may exchange capability information with one or more devices associated with UE 100 over the WPAN. For example, processor(s) 150 and/or ADP 152 may determine whether WWAN capability and/or WWAN timing information are available to a device/UE 100-$j$ associated with UE 100-$i$.

In some embodiments, upon a determination that one or more of devices/UEs 100-$j$ ($i \neq j$) associated with UE 100-$i$ over the WPAN: (i) lack WWAN access capability and/or access to WWAN timing information, and (ii) include SPS functionality, processor 150 and/or ADP 152 may provide SPS assistance information, including SPS timing assistance information to one or more of the devices/UEs 100-$j$ associated with UE 100-$i$ over the WPAN.

In some embodiments, timing information may be received by a UE 100-$i$ over the WWAN, used to obtain SPS timing assistance information, which may then be transmitted to one or more associated devices/UEs 100-$j$ ($i \neq j$) over the WPAN. The SPS timing assistance information may be transmitted: (i) when requested by one or more of the associated devices/UEs 100-$j$ ($i \neq j$); (ii) periodically; (iii) as part of, or following, a synchronization protocol between UE 100-$i$ and associated devices/UEs 100-$j$ ($i \neq j$); and/or upon power-up or wake up (e.g. from a sleep state) of associated devices/UEs 100-$j$ ($i \neq j$). For example, an associated device/UE 100-$j$ may desire to conserve battery power and request timing assistance information from UE 100-$i$ over the WPAN.

The processors, modules, and methodologies described herein may be implemented by various means depending upon the application. For example, these modules and methodologies may be implemented in hardware, firmware, software, or any combination thereof. For example, for a hardware implementation, the processor(s) 150 and/or ADP 152 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For example, ADP 152 may be implemented as a standalone processor. As another example, ADP 152 may be implemented using hardware (e.g. using functionality provided by an ASIC in processor(s) 150), software running on processor(s) 150 and/or firmware stored in memory 130, or some combination thereof.

For a firmware and/or software implementation, the methodologies may be implemented using program code, microcode, procedures, functions, and so on that perform the functions described herein. Any machine-readable medium tangibly embodying instructions may be used in implementing the methodologies described herein. For example, program code may be stored in a non-transitory computer-readable medium 160 or memory 130 that is connected to and executed by processor(s) 150.

Memory may be implemented within processor(s) 150 or external to processor(s) 150. As used herein the term "memory" refers to any type of long term, short term, volatile, nonvolatile, or other memory and is not to be limited to any particular type of memory or number of memories, or type of media upon which memory is stored. In some embodiments, memory 130 may hold program code that facilitates position location, network aware SPS assistance information transfer, and/or performance of other functions by UE 100. For example, memory 130 may hold data, program results.

In some embodiments, memory 130 on UE 100-*i* may comprise databases 135, which may hold information pertaining to associations of UEs 100-*j*, functional capability information for associated devices/UEs 100-*j*. The functional capability information for UEs 100-*j* may include one or more of: WWAN availability/capability, access to WWAN timing information, and SPS capability. In some embodiments, memory 130/databases 135 on UE 100-*i* may include information pertaining to received requests for timing assistance information from associated devices/UEs 100-*j*. In some embodiments, the information in memory 130/databases 135 may be persistent. For example, if UE 100-*i* (e.g. a mobile phone) is frequently associated with another device/UE 100-*j* (e.g. a wearable device or a vehicle navigation system) over a WPAN then UE 100-*i* may store capability and other information for device/UE 100-*j* and retrieve the information from memory 130/databases 135 upon association/re-association.

If implemented in firmware and/or software, the functions may be stored as one or more instructions or program code on a computer-readable medium, such as medium 160 and/or memory 130. Examples include computer-readable media encoded with computer programs and data associated with or used by the program. For example, the computer-readable medium including program code stored thereon may include program code to support network aware SPS assistance information transfer in a manner consistent with disclosed embodiments. The code may further support SPS/ Advanced Forward Link Trilateration (AFLT)/hybrid-AFLT/Received Signal Strength Indicator (RSSI)/Reference Signal Time Difference (RSTD)/OTDOA measurement and positioning, in part, by using location assistance information.

Computer-readable medium 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 160, instructions and/or data may be provided as signals on transmission media included in a communication apparatus. For example, a communication apparatus may include a transceiver 110, which may receive signals through receiver 114 indicative of instructions and data. The instructions and data may cause one or more processors to implement network aware timing assistance information transfer, SPS/ AFLT/hybrid-AFLT/RSTD/OTDOA measurement and positioning, and/or other functions outlined herein. That is, the communication apparatus includes transmission media with signals indicative of information to perform disclosed functions.

Memory 130 may represent any data storage mechanism. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within or otherwise co-located/coupled with processor(s) 150. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 160. As such, in certain example implementations, the methods and/or apparatuses presented herein may take the form, in whole, or in part, of a computer-readable medium 160 that may include computer implementable instructions stored thereon, which when executed by at least one processor(s) 150 may be operatively enabled to perform all or portions of the example operations as described herein, including those related to network aware SPS assistance data transfer. Computer readable medium 160 may be a part of memory 130.

Further, UE 100 may include a screen or display 190 capable of rendering color images, including 3D images. In some embodiments, display 190 may be used to display live images captured by camera(s) 180, Graphical User Interfaces (GUIs), program output, etc. In other embodiments, display 190 may be a wearable display or a heads-up display, which may be operationally coupled to camera 180, processor(s) 150, and/or other functional units in UE 100.

In some embodiments, UE 100 may optionally comprise one or more image sensors such as CCD or CMOS sensors and/or camera(s) 180, which are hereinafter referred to as "camera(s) 180". Camera(s) 180 may convert an optical image into an electronic or digital image and may send captured images to processor(s) 150. In some embodiments, camera(s) 180 may include multiple cameras, front and/or rear facing cameras, wide-angle cameras, and may also incorporate CCD, CMOS, and/or other sensors.

Figure 2:
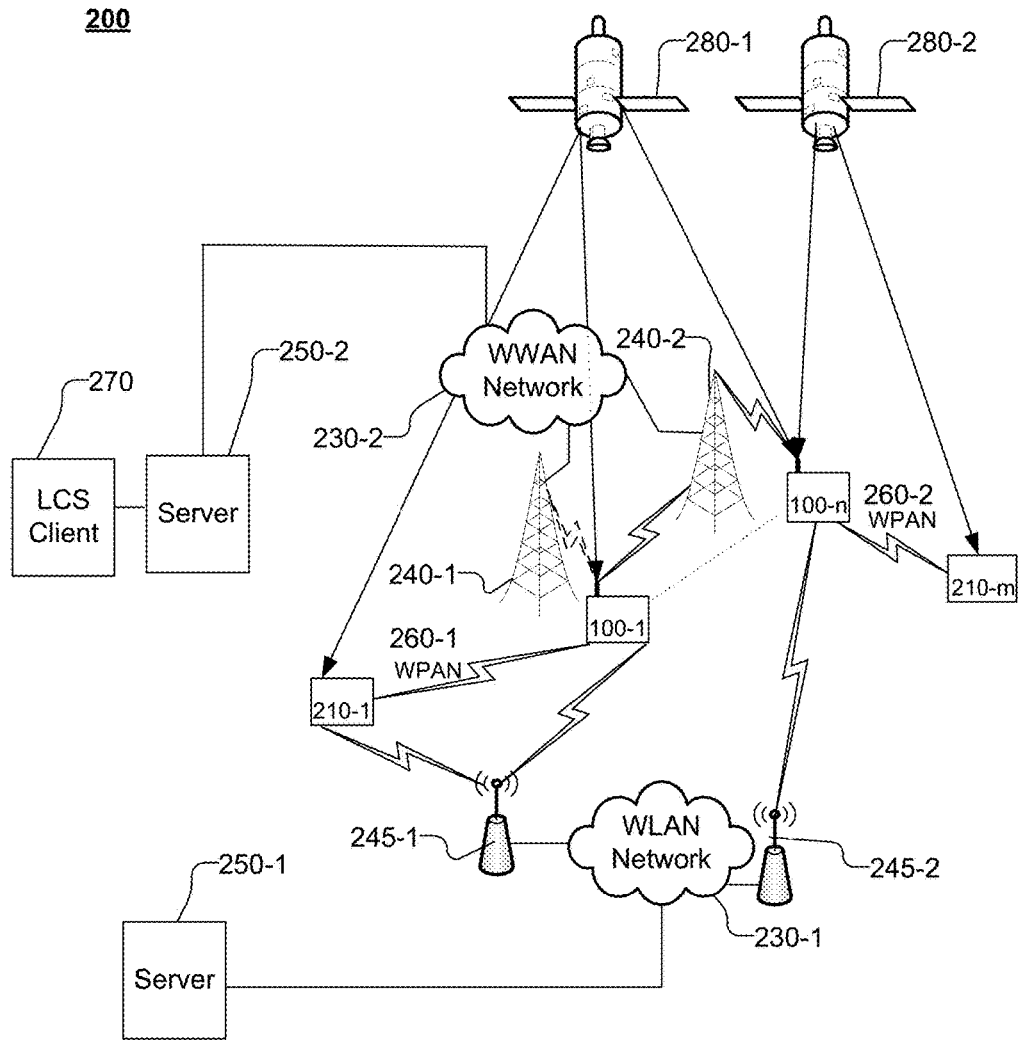
FIG. 2 shows an architecture of a system 200 capable of supporting network aware SPS assistance information transfer in accordance with certain embodiments presented herein.

FIG. 2 shows an example system 200 capable of network aware SPS assistance information transfer in accordance with certain embodiments presented herein. In some embodiments, system 200 may provide Location Services and/or other assistance to UEs. Location services may include the transfer of location assistance data or location information, using messages such as Long Term Evolution (LTE) Positioning Protocol (LPP) or LPP extensions (LPPe) messages between UEs 100-$i$ (1≤$i$≤n) and servers 250, which, in some instances, may take the form of a location server or another network entity. The transfer of the location information may occur at a rate appropriate to both UEs 100-$i$ and servers 250-1 and/or 250-2 (collectively referred to as servers 250). The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

System 200 shows antennas 240-1 and 240-2 (collectively referred to as antennas 240) and Access Points (APs) 245-1 and 245-2 (collectively referred to as APs 245), which may be in communication with n UEs 100-1 through 100-$n$, where n≥1. Antennas 240 may be coupled to server 250-2 through Wireless Wide Area Network (WWAN) 230-2, while APs 245 may be coupled to server 250-1 through Wireless Local Area Network (WLAN) 230-1. Networks 230-1 and 230-2 are collectively referred to as networks 230.

In addition, UEs 100 may be communicatively coupled to m devices 210-1 through 210-$m$, where m≥1 over WPAN 260. For example, in FIG. 2, UE 100-1 is shown coupled to device 210-1 over WPAN 260-1, while UE 100-$n$ is shown coupled to device 210-$m$ over WPAN 260-2. As shown in FIG. 2, devices 210 may include capability to receive and process signals from one or more Satellite Vehicles (SVs) 280 such as SVs 280-1 and/or 280-2. In some situations, access to WWAN 230-2 may not be available to devices 210-1 through 210-$m$. For example, devices 210 may have turned off WWAN access (e.g. to conserve battery resources), or may lack WWAN functionality, or may lack access to WWAN timing information, or may not have access to WWAN 230-1 (e.g. because they may be associated with a different WWAN provider) or access to WWAN/ WWAN signals may be functionally or contractually limited. In some embodiments, one or more devices 210-$k$ may have access to WLAN 230-2, while WLAN 230-2 may not be available to other devices 210-$l$ (k≠l). In FIG. 2, solely for descriptive reasons, devices 210 have been shown as distinct from UEs. However, one or more devices 210 above may take the form of UEs. Thus, a UE 100-$i$ may be communicatively coupled to one or more other UEs 100-$j$ (i≠j) over a WPAN where UEs 100-$j$ lack WWAN availability.

UEs 100 may receive signals from one or more Earth orbiting Space Vehicles (SVs) 280-1 or 280-2 (collectively referred to as SVs 280), which may be part of a satellite positioning system (SPS). SVs 280, for example, may be in a constellation of Global Navigation Satellite System (GNSS) such as the US Global Positioning System (GPS), the European Galileo system, the Russian Glonass system or the Chinese Compass system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As illustrated in FIG. 2, UE 100 may also communicate with server 250-1 through network 230-1 and APs 245, which may be associated with network 230-1. UE 100 may receive and measure signals from APs 245, which may be used for position determination. In some embodiments, APs 245 may form part of a wireless communication network 230-1, which may be a wireless local area network (WLAN). For example, a WLAN may be an IEEE 802.11x network.

Further, one or more UEs 100-$i$ may be communicatively coupled to one or more other UEs 100-$j$ (i≠j) over a WPAN and/or to one or more devices 210 over WPAN 260. A WPAN may be a network based on the IEEE 802.15x standards, or some other type of network. For example, a WPAN may take the form of a Bluetooth and/or a Near Field Communication (NFC) network. In some embodiments, a WPAN may be implemented using peer-to-peer (P2P) communication between proximate devices. In general, system 200 may comprise multiple cells with additional networks 230 with multiple UEs 100 coupled to networks 230-1 and/or 230-2 multiple servers 250, antennas 240, APs 245, and Space Vehicles (SVs) 180. Further, system 200 may include one or more devices 210 coupled to one or more UEs 100 over a WPAN 260.

As illustrated in FIG. 2, UE 100 may communicate with server 250-2 through network 230-2 and antennas 240, which may be associated with network 230-2. UE 100 may receive and measure signals from antennas 240, which may be used for position determination. In some embodiments, antennas 240 may form part of a wireless communication network, which may be a wireless wide area network (WWAN). A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available.

In some embodiments, UEs 100 may receive assistance information over WWAN 230-2, which may include SPS related information. For example, servers 250 or another entity associated with WWAN network 230-2 may hold SPS related information, which may include SPS timing related information. In some embodiments, UEs 100 may use the SPS related information/assistance information received over WWAN 230-2 to search for and acquire signals from SVs 280 to determine their respective positions. One or more UEs 100 may be capable of wirelessly communicating with servers 250 through one or more networks 230 that support positioning and location services, which may include but are not limited to the Secure User Plane Location (SUPL) location solution defined by OMA and the Control Plane location solution defined by 3GPP for use with an LTE serving network.

For example, Location services (LCS) may be performed on behalf of LCS Client 270 that accesses server 250-2 (which may take the form of a location server) and issues a request for the location of UE 100. Server 250-2 may then respond to LCS client 270 with a location estimate for UE 100. LCS Client 270 may also be known as a SUPL Agent—e.g. when the location solution used by server 250 and UE 100 is SUPL. In some embodiments, UE 100 may also include an LCS Client or a SUPL agent (not shown in FIG. 2) that may issue a location request to some positioning capable function within UE 100 and later receive a location estimate for UE 100. The LCS Client or SUPL Agent within UE 100 may perform location services for the user of UE 100—e.g. provide navigation directions or identify points of interest in the vicinity of UE 100. Server 250-2 as used herein may be a SUPL Location Platform (SLP), an evolved Serving Mobile Location Center (eSMLC), a Serving Mobile Location Center (SMLC), a Gateway Mobile Location Center (GMLC), a Position Determining Entity (PDE), a Standalone SMLC (SAS), and/or the like.

In some embodiments, UEs 100 may determine SPS assistance information, including SPS timing assistance information, based on timing information in WWAN transmissions. The SPS timing assistance information may include corrected SPS time. In some embodiments, UEs 100 may transmit some or all of the SPS assistance information including SPS timing assistance information to devices 210 over WPAN 260. In some embodiments, the SPS assistance information may be unicast, multicast, or broadcast to one or more devices 210 that are associated with UE 100-$i$ over WPAN 260. In some embodiments, the SPS timing assistance information may also be unicast, multicast or broadcast over a WPAN to one or more associated UEs 100-$j$ (i≠j).

In some embodiments, the SPS assistance information including SPS timing assistance information, may be based, in part, on information broadcast or received by UE 100-$i$ over WWAN 230-2. In some embodiments, UEs 100 may augment or otherwise modify the information received over WWAN 230-2 to obtain SPS assistance information including SPS timing assistance information for transmission to devices 210 over WPAN 260. For example, UE 100-$i$ may determine corrected SPS time based on WWAN timing information. Further, the corrected SPS time may be augmented to reflect communication delays ($\delta_{WPAN}$) between UE 100-$i$ and device 210 (or another UE 100-$j$ (i≠j)) over WPAN 260 prior to transmission.

Thus, corrected SPS time may be transmitted by UE 100-$i$ without modification, and/or (ii) reflect WPAN channel communication delays ($\delta_{WPAN}$) for the channel between UE 100-$i$ and device 210 (or another UE 100-$j$). Conversely, a device 210-$l$ (or another UE 100-$j$) receiving corrected SPS time may: (i) use the received corrected SPS time without modification, and/or (ii) modify the received corrected SPS time to reflect WPAN channel communication delays ($\delta_{WPAN}$) for the channel between UE 100-$i$ and device 210 (or another UE 100-$j$). In some embodiments, UE 100-$i$ may provide an indication of whether corrected SPS time reflects WPAN channel communication delays.

In some embodiments, a UE 100 may: (i) upon association with a device 210, and/or (ii) periodically, and/or (iii) upon request, perform a calibration process to determine communication channel delays in WPAN 260 between UE 100 and the associated device 210. The SPS timing assistance information transmitted over WWAN 230-2 by UE 100 may be augmented and/or modified based on calibration parameters and/or calibration determined communication channel delay for a corresponding WPAN 260. For example, a beacon or other packet may be transmitted from UE 100-$i$ and device 210 (or another UE 100-$j$), which may be configured to respond to the beacon packet. By measuring the round trip time (RTT) between the time of transmission and the time of reception of the response, delays in the communication channel may be calibrated. In some embodiments, the RTT measurement may be performed several times and/or periodically to accurately calibrate the delay.

In some embodiments, communication channel delays with an associated UE 100 over a corresponding WPAN 260 may be determined by device 210 (i) upon association with a UE 100, and/or (ii) periodically, and/or (iii) upon request. In some embodiments, upon determination of communication channel delays for a WPAN 260, the corresponding WPAN channel communication delays and/or calibration parameters may be communicated by UE 100/device 210 to its WPAN counterpart.

In some embodiments, SPS timing assistance information may be transmitted by UE 100 without modification or adjustment for channel communication delays or calibration parameters. In some embodiments, SPS timing assistance information may be used by receiving device 210 without further modification. In some embodiments, SPS timing assistance information may be appropriately adjusted by receiving device 210 based on calibration parameters and/or channel communication delays between UE 100 and receiving device 210 for the corresponding WPAN 260.

The techniques may also be implemented in conjunction with other combinations of WWAN, WPAN and/or WLAN. For example, antennas 240-1 and 240-2 and network 230-2 may form part of, e.g., an evolved UMTS (Universal Mobile Telecommunications System) Terrestrial Radio Access Network (E-UTRAN) (LTE) network, a W-CDMA UTRAN network, a GSM/EDGE Radio Access Network (GERAN), a 1×RTT network, an Evolution-Data Optimized (EvDO) network, a WiMax network or a WLAN.

Figure 3:
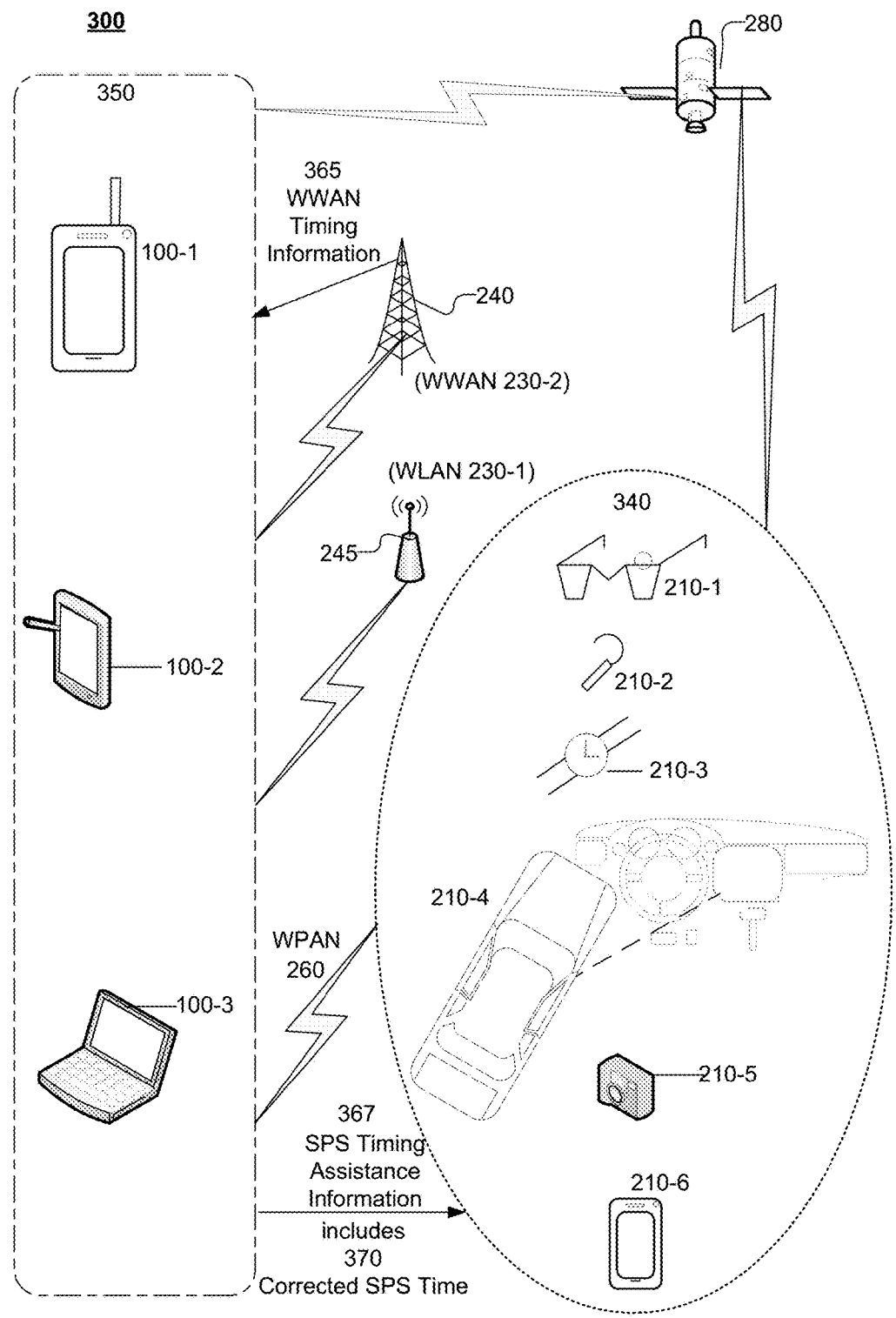
FIG. 3 shows a system 300 to facilitate network aware SPS assistance information transfer in accordance with certain embodiments presented herein.

FIG. 3 shows a system 300 to facilitate network aware timing assistance information transfer in accordance with certain embodiments presented herein. FIG. 3 shows a system 300 comprising a set 350 of UEs 100-$i$ (1≤i≤n) and a set 340 of devices 210-$l$ (1≤l≤m). As shown in FIG. 3, one or more UEs 100-$i$ in set 350 may be coupled to one or more devices 210-$l$ in set 340 over WPAN 260. In some embodiments, SPS assistance information may be transferred by one or more UEs 100-$i$ in set 350 over WPAN 260 to one or more associated devices 210-$l$ in set 340. In some embodiments, SPS assistance information may include SPS timing assistance information 367. In some embodiments, SPS timing assistance information 367 may include corrected SPS time information 370. In some embodiments, corrected SPS time information 370 may include accurate SPS reference time information (e.g. GPS time) that may facilitate signal acquisition on SVs 280 by the associated UE 100/device 210 receiving corrected SPS time information 370.

In FIG. 3, one or more UEs 100-$i$ in set 350 may be wirelessly coupled to WLAN 230-1 and/or WWAN 230-2 (e.g. through APs 245, and/or antennas 240, respectively). In some embodiments, one or more UEs 100-$i$ in set 350 may also be coupled to one or more SVs 280.

In describing FIG. 3, solely for explanatory reasons, the functions of one more devices shown in FIG. 3 have been specified. In FIG. 3, UE 100-1 is shown as a cell phone, while UE 100-2 is shown as a handheld computing device, while UE 100-3 is shown as a computing device. UEs 100-1, 100-2 and 100-3 may receive WWAN timing information 365 over WWAN 230-2. UEs 100-1, 100-2 and 100-3 may be coupled to one or more proximate devices 210-1 through 210-6 in set 340 through WPAN 260. WPAN 260 may be a Bluetooth network, NFC network, or some other form of P2P communication. Set 340 (indicated in FIG. 3 by the dotted ellipse) of devices may include: device 210-1 shown as a WPAN enabled headset; device 210-2 shown as a WPAN enabled headphone; device 210-3 shown as a wearable WPAN enabled watch; device 210-4 shown as a WPAN enabled vehicular navigation system; device 210-5 shown as a camera/imaging device; and device 210-6, which may be a SPS device, computing and/or gaming device. Devices 210-1 through 210-6 may include SPS functionality. In some instances, devices 210 may not have WWAN capability available and may lack direct access to information available over a WWAN such as WWAN 230-2. The list above is merely exemplary and not exhaustive. In some embodiments, devices 210-1 and/or 210-2 may take the form of, or may form part of an Augmented Reality (AR) or Virtual Reality (VR) device and/or a gaming headset. Devices 210 may also include UEs. For example, WWAN 230-2 may not be available to a UE 100 in set 340 and UE 100 in set 340 may be coupled to one or more UEs in set 350 over WPAN 260. In general, set 340 may include any device with SPS functionality but without direct access to WWAN 230-2.

In some embodiments, one or more devices 210-$l$ in set 340 may receive corrected SPS time information 370 over WPAN 260 from one or more UEs 100-$i$ in set 350. In some embodiments, UEs 100-$i$ in set 350 may receive: (i) WWAN timing information 365 from one or more entities associated with WWAN 230-2; and/or (iii) infer timing assistance information based on information, including WWAN timing information 365, transmitted by WWAN 230-2.

In some embodiments, UEs 100-$i$ in set 350 may transmit corrected SPS time information 370, which may be based, in part, on WWAN timing information 365, to one or more associated devices 210-$l$ in set 340 over WPAN 260. In some embodiments, the SPS timing assistance information 370 may be unicast, multicast, or broadcast to one or more devices 210-$l$ associated with UE 100-$i$ over WPAN 260. In some embodiments, set 340 may further include one or more associated UEs 100-$j$ ($i \neq j$) (not shown in FIG. 3), which may not have WWAN access available, and corrected SPS time information 370 may also be unicast, multicast or broadcast over WPAN 260 to one or more associated UEs 100-$j$.

In some embodiments, WWAN timing information 365 obtained by a UE 100 in set 350 may be augmented or otherwise modified to obtain SPS timing assistance information 367 including corrected SPS time information 370. SPS timing assistance information 367/corrected SPS time information 370 may then be transmitted to one or more associated devices 210-$l$ in set 340 over WPAN 260. In some embodiments, corrected SPS time information 370 may reflect communication delays between UE 100-$i$ and an associated device 210-$l$. In some embodiments, a UE 100-$i$ may: (i) upon association with a device 210-$l$, and/or (ii) periodically, and/or (iii) upon request, perform a calibration process to determine communication channel delays between UE 100-$i$ and the associated device 210-$l$ over the respective WPAN 260. In some embodiments, corrected SPS time information 370 may reflect WPAN channel calibration parameters and/or a calibration determined WPAN communication channel delay ($\delta_{WPAN}$).

In some embodiments, WPAN communication channel delays ($\delta_{WPAN}$) with an associated UE 100 may be determined by device 210-$l$ (i) upon association with a UE 100-$i$, and/or (ii) periodically, and/or (iii) upon request by UE 100-$i$. In some embodiments, upon determination of WPAN communication channel delays, the WPAN channel communication delays and/or calibration parameters may be communicated by UE 100-$i$/device 210-$l$ to the counterpart associated device. In some embodiments, corrected SPS time information 370 may be transmitted without modification (e.g. for channel communication delays) or adjustment (e.g. based on calibration parameters) related to a channel on the respective WPAN 260. In some embodiments, receiving device 210-$l$ may use SPS timing assistance information 370 without modification. In some embodiments, receiving device 210-$l$ may appropriately adjust SPS timing assistance information 370 based on calibration parameters and/or channel communication delays between UE 100-$i$ and receiving device 210-$l$ for the respective WPAN 260 prior to utilization (e.g. to obtain a fix on one or more SVs 280).

Figure 4:
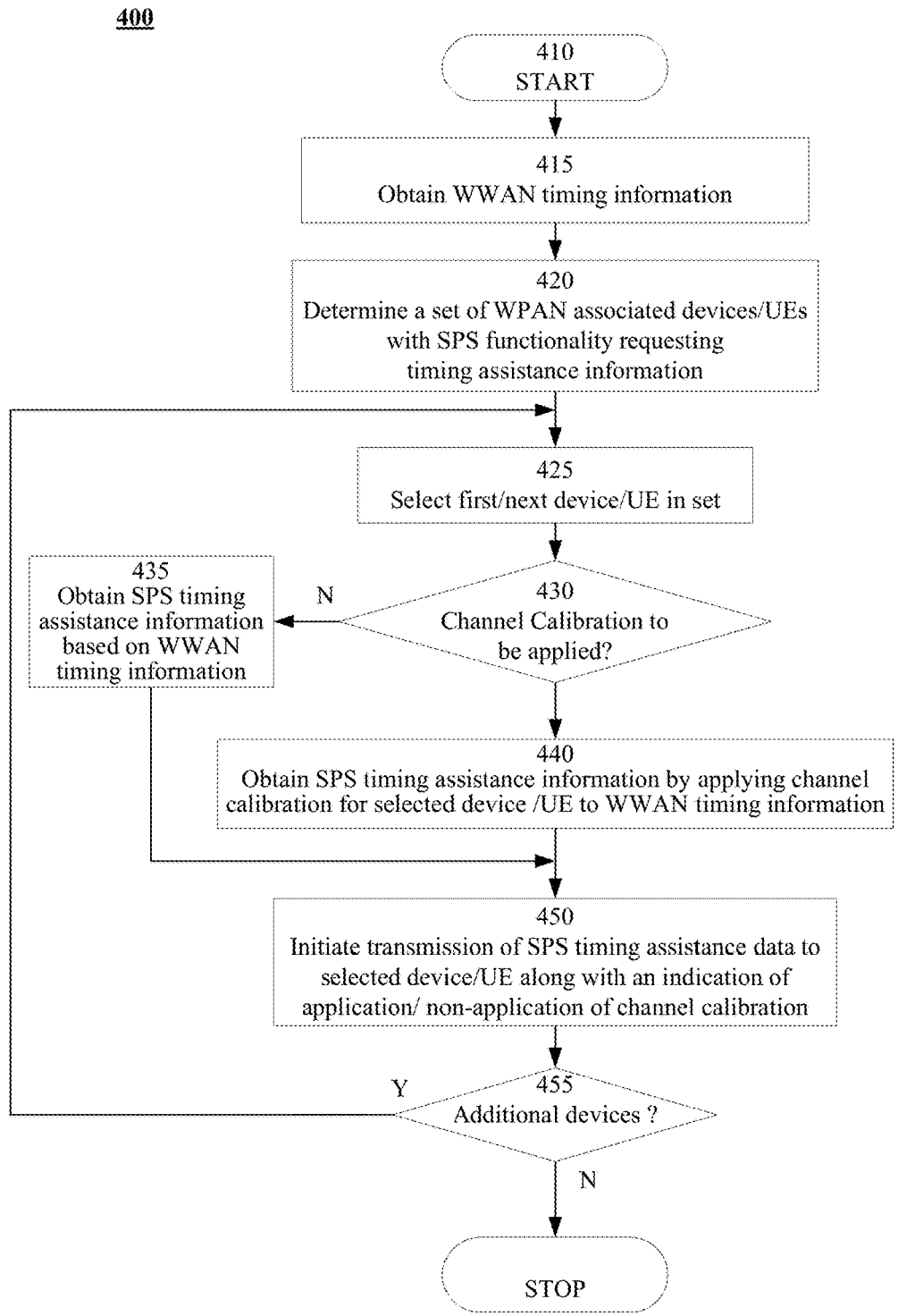
FIG. 4 shows a flowchart of an exemplary method 400 for proximity based proxy device usage in accordance with certain embodiments presented herein.

FIG. 4 shows a flowchart of an example method 400 for network aware SPS assistance information transfer in accordance with certain embodiments presented herein. In some embodiments, method 400 may be performed by one or more UEs 100 in a system comprising a plurality of UEs 100. In some embodiments, method 400 may be performed, at least in part, by ADP 152.

In some embodiments, method 400 may be performed by a UE 100: (i) upon a request for timing assistance from a device associated with UE 100 (e.g. over a WPAN); or (ii), as part of (or following) a synchronization protocol (e.g. a WPAN synchronization protocol) between UE 100 and an associated device requesting timing assistance; and/or (iii) when an associated device is powered up, and/or wakes from a sleep or idle state; and/or (iv) periodically.

After commencing in block 410, WWAN timing information 365 may be obtained in block 415. For example, WWAN timing information may be obtained by UE 100 from WWAN network 230-2. In some embodiments, WWAN timing information 365 may be used to maintain a real time clock (RTC) on UE 100. For example, a system frame number and/or sub-frame number may be used to synchronize the RTC on UE 100. In some embodiments, where UE 100 also maintains a SPS time, the SPS time may be tagged with the system frame number and/or sub-frame number.

In some embodiments, in block 420, UE 100 may determine a set of WPAN associated devices/UEs with SPS functionality requesting timing assistance information. In some embodiments, the requesting devices may include SPS functionality and be associated with UE 100 over WPAN 260. For example, referring to FIG. 3, UE 100-1 may determine that one or more associated devices 210-$l$ in set 340 have requested timing assistance. In some embodiments, in block 420, UE 100 may determine that one or more associated devices 210-*l* includes SPS functionality and do not have WWAN capability available. For example, UE 100 may determine a lack of WWAN capability based on previously stored capability information for an associated device, or capability information provided by the associated device.

Accurate knowledge of SPS time (e.g. GPS time or time for some other GNSS) can improve the performance of an assisted-SPS (e.g. A-GPS) positioning by both reducing the delay to acquire and measure signals from the SPS (e.g. GPS or other GNSS SVs) and ensuring higher accuracy.

Without information related to position and time, a device with SPS functionality may perform a full 3-D search over all SPS SVs (e.g. as many as 32 SVs for GPS), the full range of possible Doppler frequency shifts for each SV and all possible phase shifts of the PRN code for each SV. In addition, devices typically obtain time information to resolve SPS code phase ambiguities in the pseudorange measurement for each SV and to determine the location of each measured SV. Typically, the above functions assume reception of a strong SV signal and adequate response time: to demodulate navigation data and extract time explicitly, or to obtain measurements of additional SVs to solve for time.

For some user devices with SPS functionality but lacking WWAN availability, maintaining SPS time accurately may present challenges because of local clock drift on the user devices. When a device has access to a coarse initial time estimate and an approximate initial location estimate, a device with SPS functionality may be able to narrow the signal search. A coarse initial location estimate may be obtained by various means available to device requesting timing assistance and/or may be provided by UE 100 based on, for example, an association of UE 100 with the serving mobile country code or a base station identifier associated with WWAN 230-2. However, the device requesting time assistance information, may further desire more accurate time resolution. For example, with an initial time estimate accurate to around 0.5 ms or better, an SPS capable device may be able to resolve SPS time without the need for one strong SV signal or additional SV measurements. With increasing initial location and time accuracy, the search space can be further narrowed thereby facilitating a faster TTFF.

In some embodiments, WWAN networks, such as WWAN 230-2 may provide information or assistance data related to SPS (e.g. GPS) time. For example, an LPP location session may be used by UE 100 to obtain SPS (e.g. GPS) timing information from a network entity such as the E-SMLC. SPS timing information may also be provided by other WWANs, for example, UMTS (or variants thereof) and/or CDMA 2000 and/or GSM or various other WWANs described above. As another example, SPS/GPS time may be provided in the System Information Block 8 (SIB8) in or System Information Block 16 (SIB16) in LTE, or in information broadcast by a WWAN based on CDMA2000. In some embodiments, SPS time information may be determined and/or corrected based on the LTE System Frame Number (SFN) and a LTE sub-frame number. In some embodiments, a WWAN network may directly broadcast SPS (e.g. GPS) time. In some embodiments, information for one or more other SPS'/GNSS' may be obtained based on the broadcasted SPS time information. For example, time information for GLONASS may be obtained from GPS time. Thus, time information for one or more SPS may be obtained based on the information available/broadcast over a WWAN.

Referring to FIG. 4, in some embodiments, in block 425, the first or next device in the set of devices associated with UE 100 over WPAN 260 may be selected. For example, referring to FIG. 3, one of the devices (e.g. device 210-4) may be selected from the set 340.

Referring to FIG. 4, in block 430, it is determined whether channel calibration is to be applied. If channel calibration is to be applied ("Y" in block 430), then, in block 440, SPS timing assistance information 367 may be obtained based on WWAN timing information 365 and channel calibration parameters or the channel communication delay ($\delta_{WPAN}$) over the communication channel between UE 100 and the selected UE/device 210. In some embodiments, SPS timing assistance information 367 may include corrected SPS time information 370. For example, calibration parameters or the channel communication delay ($\delta_{WPAN}$) for a WPAN channel between UE 100 and device 210 may be used to obtain corrected SPS time information 370 from WWAN timing information 365.

In some embodiments, if a channel communication delay is requested but not available, a default, average, median, historical, and/or other statistical measure may be used as an initial measure of a channel communication delay. For example, UE 100 may average communication delays for devices that it is currently associated with, or average communication delays for devices it has been associated with in the recent past or over some historical time period to obtain an initial estimate of channel communication delays ($\delta_{WPAN}$). As one example, for a Bluetooth network with typical effective range of around 10 m, the initial estimate of channel communication delays ($\delta_{WPAN}$) may be set at $$\delta_{WPAN} \frac{10 \text{ m}}{(3 \times 10^8) \text{ m/s}} = 33.33 \text{ ns.}$$

In some embodiments, when channel calibration in being applied, consistency of channel calibration parameters may be validated by comparing the delay computed by relevant devices with initial, expected or stored values of the channel calibration parameters. For example, a statistical measure of channel calibration parameters may be obtained based on the plurality of communications with associated devices/UEs. As another example, the channel communication delay between devices communicating in one direction (e.g. from UE 100-*i* to UE 100-*j*, i≠j) may be used to validate communication delays in another direction (e.g. from UE 100-*j* to UE 100-*i*) and/or to determine a RTT communication delay. In some embodiments, stored values of channel calibration parameters may be updated based on currently determined values for those parameters. In some embodiments, updates to stored values of calibration parameters may be performed by include statistically aggregating currently determined values of calibration parameters with stored values. In some embodiments, currently determined values of calibration parameters may replace stored values. In some embodiments, statistical measures such as a standard deviation, variance, confidence intervals etc may be associated with the calibration parameters based on the currently determined and/or stored values of the calibration parameters.

If channel calibration is not to be applied ("N" in block 430), then, in block 435, SPS timing assistance information 367/corrected SPS time information 370 may be obtained based on WWAN timing information 365 without consideration of channel communication delays between UE 100 and device 210.

In block 450, processor(s) 150 and/or ADP 152 may initiate transmission of SPS timing assistance information 367/corrected SPS time information 370 to the selected associated device 210. In some embodiments, the SPS timing assistance information 367/corrected SPS time information 370 may include an indication of whether channel calibration was applied. In some embodiments, the SPS timing assistance information 367/corrected SPS time 370 may be transmitted over WPAN 260. In embodiments where UE 100 maintains a SPS time and the SPS time is tagged with the system frame number and/or sub-frame number, the SPS time tagged with the system frame number and/or sub-frame number may be sent to select associated device 210.

In some embodiments, in block 455, if there are additional devices ("Y" in block 455) another iteration is commenced for the next selected device associated over WPAN 260. If there are no additional devices ("N" in block 455), then, method 400 may be terminated.

In some embodiments, for example, when channel calibration is not applied, UE 100 may broadcast SPS timing information 370 to all devices associated over WPAN 210. In some embodiments, when channel calibration is applied, UE 100 may group devices into categories based on the channel communication delays, and multicast corrected SPS time information 370 to devices in each category. An average or median channel communication delay for the category may be used to obtain corrected SPS time information 370.

Figure 5:
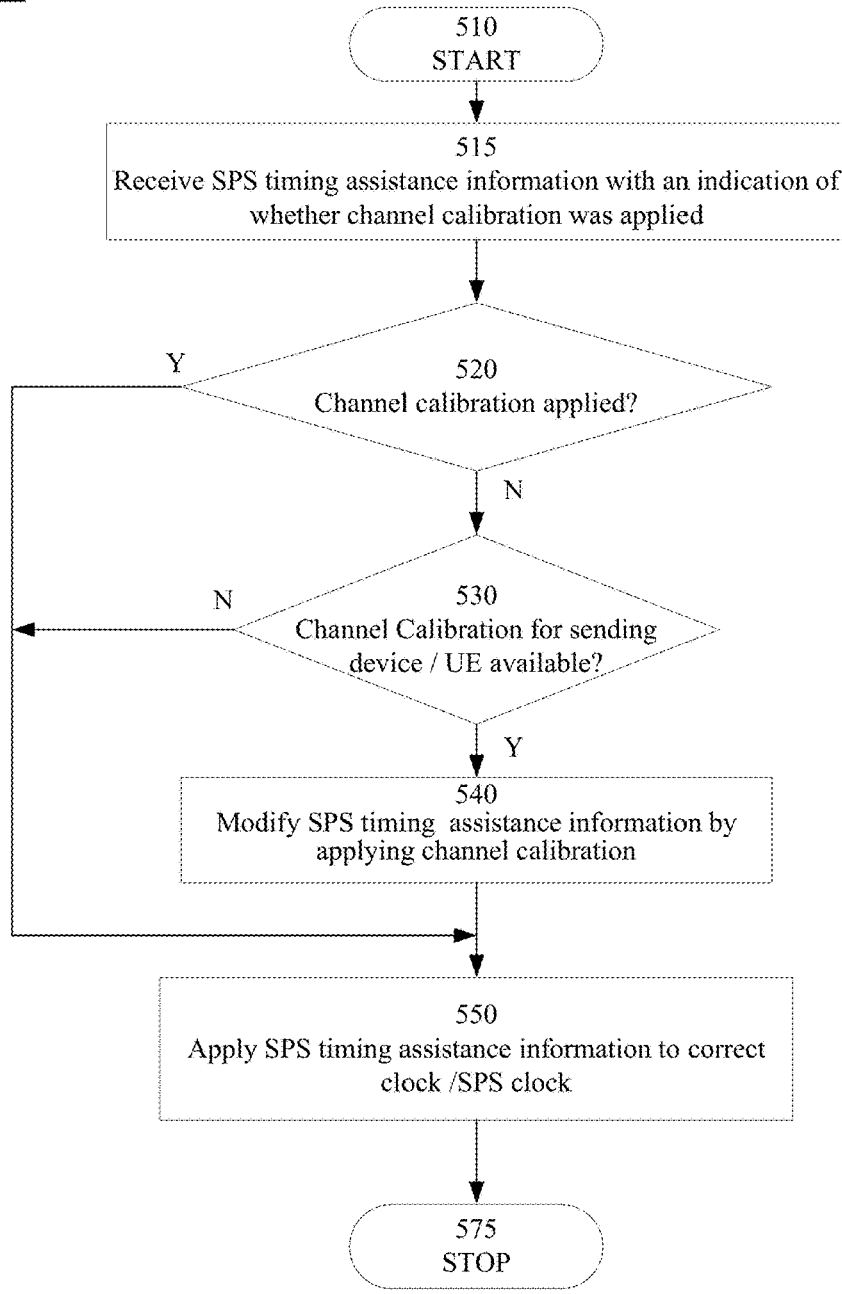
FIG. 5 shows a flowchart of an exemplary method 500 for position determination using associated proximate proxy devices in accordance with certain embodiments presented herein.

FIG. 5 shows a flowchart of an example method 500 for network aware SPS assistance data transfer. In some embodiments, method 500 may be performed by a receiving device 210/UE 100-$j$ based on corrected SPS time information 370 transmitted by a UE 100-$i$ (i≠j) over WPAN 260.

In some embodiments, SPS timing assistance information 367/corrected SPS time information 370 may be: (i) requested by receiving device 210/UE 100-$j$; (ii) transmitted by UE 100-$i$ based on a determination that: (a) WWAN timing information 365 is available over WWAN 230-2; (b) WWAN timing information 365 and/or WWAN access is unavailable to device 210/UE 100-$j$; and (c) device 210/UE 100-$j$ includes SPS capability.

In some embodiments, in block 515, SPS timing assistance information 367/corrected SPS time 370 may be received. In some embodiments, SPS timing assistance information 367/corrected SPS time 370 may include an SPS time tagged with the system frame number and/or sub-frame number.

In some embodiments, the SPS timing assistance information 367/corrected SPS time 370 may include an indication of whether channel calibration or communication delays ($\delta_{WPAN}$) for a channel between UE 100-$i$ and device 210/UE 100-$j$ (i≠j) were applied. In some embodiments, an indication of whether channel calibration or communication delays for a channel between UE 100-$i$ and device 210/UE 100-$j$ (i≠j) were applied may be sent separately from SPS timing assistance information 367/corrected SPS time 370, and/or may be indicated as part of a protocol between UE 100-$i$ and device 210/UE 100-$j$, prior to the commencement of method 500.

In block 520, if received SPS timing assistance information 367/corrected SPS time information 370 includes channel calibration or channel communication delays ("Y" in block 520), then, block 550 is invoked.

In block 520, if received SPS timing assistance information 367/corrected SPS time information 370 does not include channel calibration or channel communication delays ("N" in block 520), then, in block 530, it is determined whether channel calibration is to be applied.

If channel calibration is to be applied ("Y" in block 530), then, in block 540, corrected SPS time information 370 may be augmented or modified based on channel calibration parameters or the channel communication delay ($\delta_{WPAN}$) for the WPAN communication channel between transmitting UE 100-$i$ and the receiving UE 100-$j$ (i≠j)/device 210. In some embodiments, if a channel communication delay is not currently available, a default, average, median, historical, and/or other statistical measure may be used as an initial measure of a channel communication delay. Next, block 550 is invoked. If channel calibration is not to be applied ("N" in block 530), then, block 550 is invoked.

In some embodiments, when channel calibration in being applied, consistency of channel calibration parameters may be validated by comparing the delay computed by relevant devices with initial, expected or stored values of the channel calibration parameters. For example, a statistical measure of channel calibration parameters may be obtained based on the plurality of communications with associated devices/UEs. As another example, the channel communication delay between devices communicating in one direction (e.g. from UE 100-$i$ to UE 100-$j$, i≠j) may be used to validate communication delays in another direction (e.g. from UE 100-$j$ to UE 100-$i$) and/or to determine a RTT communication delay. In some embodiments, stored values of channel calibration parameters may be updated based on currently determined values for those parameters. In some embodiments, updates to stored values of calibration parameters may be performed by include statistically aggregating currently determined values of calibration parameters with stored values. In some embodiments, currently determined values of calibration parameters may replace stored values. In some embodiments, statistical measures such as a standard deviation, variance, confidence intervals etc may be associated with the calibration parameters based on the currently determined and/or stored values of the calibration parameters.

In block 550, SPS timing assistance information 367/corrected SPS time information 370 may be applied to correct clock drift and/or SPS clock on receiving device 210/UE 100-$j$. In some embodiments, the corrected SPS clock may be used to search for one or more SVs 280 and/or to obtain a fix.

In some embodiments, method 500 may be performed periodically, and/or upon receipt of SPS timing assistance information 367/corrected SPS time information 370. Method 500 may help maintain time accuracy and/or limit clock drift in receiving device 210/UE 100-$j$.

Figure 6:
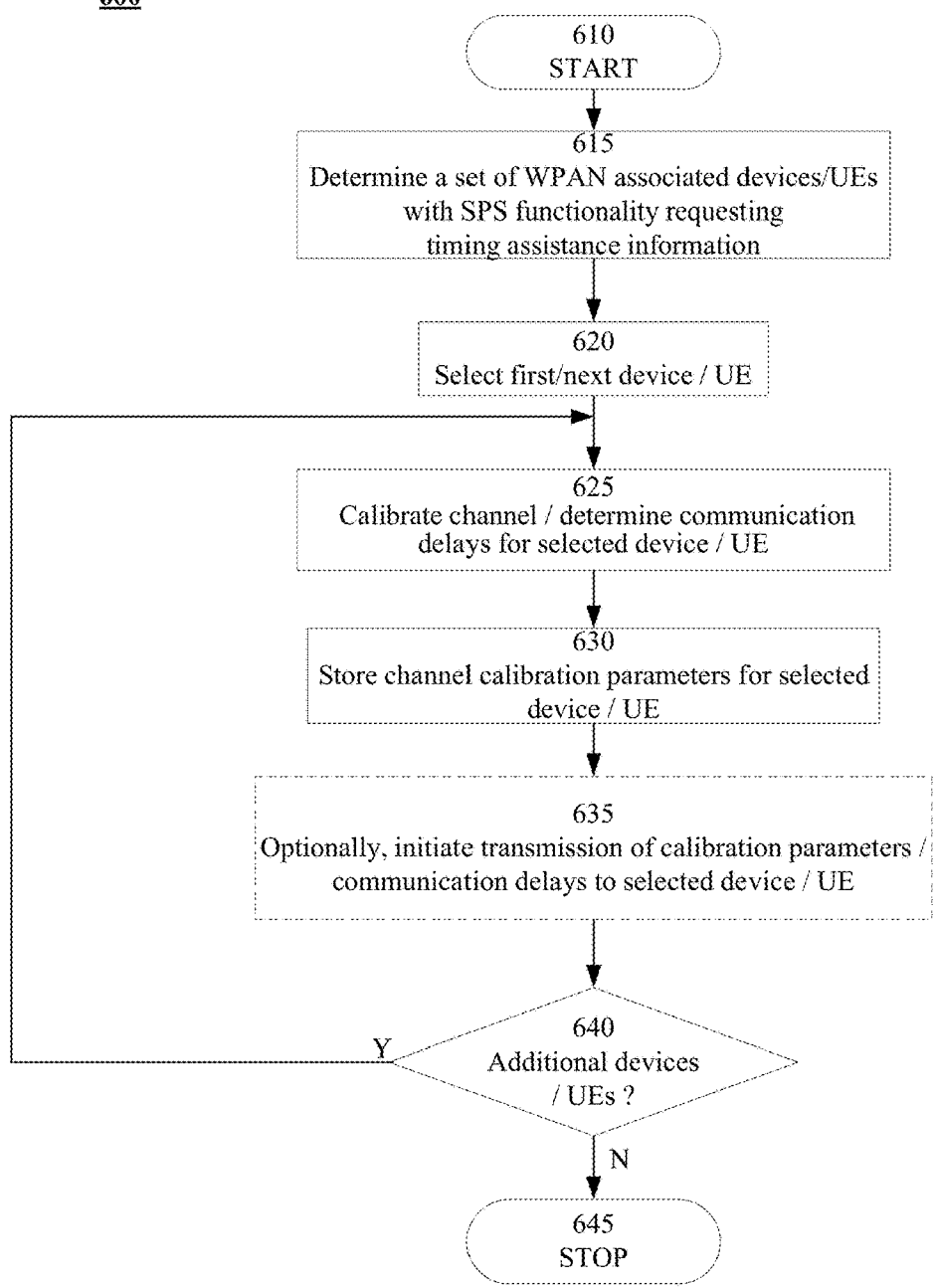
FIG. 6, which is a schematic block diagram illustrating a server 250 to support proximity based device usage in accordance with certain embodiments presented herein.

FIG. 6 shows an example method 600 for channel calibration between UE 100-$i$ and devices 210/UE 100-$j$ (i≠j) associated over WPAN 260. In some embodiments, method 600 may be performed by UE 100-$i$ transmitting SPS timing assistance information 370 over WPAN 260. In some embodiments, method 600 may be performed by UE 100-$i$ for each device 210/UE 100-$j$ to which SPS timing assistance information 370 may be transferred over WPAN 260.

In block 615, a set of devices 210/UE 100-$j$ associated with a UE 100-$i$ (i≠j) transmitting SPS timing assistance information 370 over WPAN 260 may be determined. In block 620, the first or next device 210/UE 100-$j$ in the set may be selected.

In block 625, the communication channel may be calibrated. For example, two or more packets may be exchanged between UE 100-$i$ and device 210/UE 100-$j$ and a Round Trip Time (RTT) for the packet exchange may be determined. For example, a beacon or other packet may be transmitted from UE 100-$i$ and device 210 (or another UE 100-$j$), which may be configured to respond to the beacon packet. By measuring the round trip time (RTT) between the time of transmission and the time of reception of the response, delays in the communication channel may be calibrated. In some embodiments, the RTT measurement may be performed several times and/or periodically to accurately calibrate the delay.

In some embodiments, RTT may be determined as an average, median etc based on a plurality of RTT measurements within some time interval. In some embodiments, a standard deviation, variance or other statistical measure may be used adjust the determined RTT delay for communication between UE 100-$i$ and device 210/UE 100-$j$ over a communication channel in WPAN 260. In some embodiments, calibration parameters, which may include RTT delay, statistical measures derived from the RTT measurements, etc may be used to characterize the communication channel between UE 100-$i$ and device 210/UE 100-$j$ over WPAN 260.

In some embodiments, in block 630, the channel communication delay and/or calibration parameters for the channel between UE 100-$i$ and device 210/UE 100-$j$ may be stored and associated with UE 100-$i$ or device 210/UE 100-$j$.

In some embodiments, consistency of channel calibration parameters may be validated by comparing the delay computed by relevant devices with initial, expected or stored values of the channel calibration parameters. For example, a statistical measure of channel calibration parameters may be obtained based on the plurality of communications with associated devices/UEs. As another example, the channel communication delay between devices communicating in one direction (e.g. from UE 100-$i$ to UE 100-$j$, $i \neq j$) may be used to validate communication delays in another direction (e.g. from UE 100-$j$ to UE 100-$i$) and/or to determine a RTT communication delay.

In some embodiments, any previously stored and/or initial and/or existing values of channel calibration parameters may be updated based on currently determined values for those parameters. In some embodiments, updates to stored values of calibration parameters may be performed by include statistically aggregating currently determined values of calibration parameters with stored values. In some embodiments, currently determined values of calibration parameters may replace stored values. In some embodiments, statistical measures such as a standard deviation, variance, confidence intervals etc may be associated with the calibration parameters based on the currently determined and/or stored values of the calibration parameters.

In block 635, the transmission of calibration parameters may optionally be initiated to the counterpart device 210/UE 100-$j$.

In block 640, if there are additional devices UEs ("Y" in block 640), then, another iteration may be commenced with the next device 210/UE 100-$j$ in the set. If there are no additional devices in the set, ("N" in block 640), then method 600 may be terminated.

In some embodiments, method 600 may be performed by a UE 100-$i$ broadcasting or multicasting a calibration packet to a plurality of associated devices 210/UEs 100-$j$ over WPAN 260 and determining a RTT for each associated device 210/UE 100-$j$ based on the time of transmission of the calibration packet and the time of reception of the respective received packet.

In some embodiments, portions of method 600 may be performed by device 210/UE 100-$j$ ($i \neq j$) receiving SPS timing assistance information 370. For example, blocks 625, 630 and 635 may be performed by a device 210/UE 100-$j$ in relation to a UE 100-$i$ to which device 210/UE 100-$j$ is communicatively coupled over WPAN 260.

Although exemplary method 600 described above may be used to determine channel communication delays and/or determine channel calibration parameters and/or characterize a communication channel between two devices, it should be noted that channel calibration may be performed and/or channel calibration parameters updated in a continuous fashion and/or periodically based on channel communication delays observed when a device (e.g. UE 100-$i$) communicates with another device (e.g. UE 100-$j$, $i \neq j$). For example, channel communication delays and/or channel calibration parameters may be determined, updated and/or validated, and/or communication channels may be characterized, when messages are exchanged between UE 100-$i$ and UE 100-$j$ ($i \neq j$) when performing methods 400 and/or 500 above.

Figure 7:
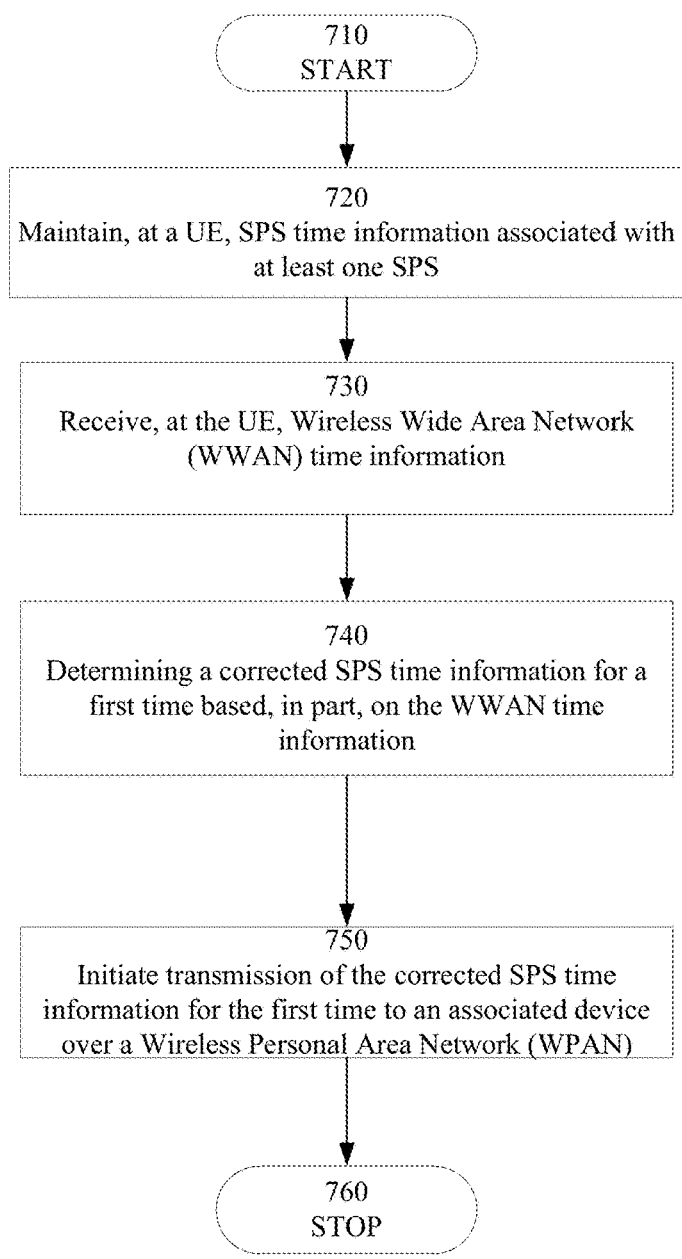
FIG. 7 shows a flowchart of an exemplary method 700 to facilitate proximity based proxy device usage in accordance with certain embodiments presented herein.

FIG. 7 shows an example method 700 for network aware SPS assistance data transfer in accordance with some disclosed embodiments.

After commencing in block 710, in block 720, SPS time information associated with at least one SPS may be maintained. For example, SPS time information may be maintained at UE 100-$i$.

In block 730, WWAN time information 365 may be received. For example, WWAN time information 365 may be received by UE 100-$i$ over WWAN 230-2. In some embodiments, the WWAN may comprise a cellular communications network. In some embodiments, the WWAN time information may comprise network broadcast SPS time information such as GPS time information. In some embodiments, the SPS time and/or GPS time may be provided as part of an LTE System Information Block (SIB). For example, the SIB may be one of one of System Information Block 8 (SIB8) or System Information Block 16 (SIB16) for LTE. In some embodiments, the WWAN may comprise a cellular communication network such as the Code Division Multiple Access (CDMA2000) network and the network broadcast SPS time may be GPS time.

In block 740, the corrected SPS time information may be determined for a current time based, in part, on received WWAN time information. In some embodiments, the corrected SPS time information for the current time may be determined by correcting the SPS time information based further on an RTT communication delay between UE 100-$i$ and device 210/UE 100-$j$ associated with UE 100-$i$ over the WPAN.

In some embodiments, the corrected SPS time information for the current time may be determined by estimating, based on the WWAN time information, a time uncertainty associated with the corrected SPS time information for the first time and determining the corrected SPS time based on the time uncertainty. In some embodiments, the WWAN may comprise a cellular communications network such as a Long Term Evolution (LTE) network, the WWAN time information may comprise a LTE System Frame Number (SFN) and a LTE sub-frame number, the corrected SPS time information may be determined based on the LTE SFN and the LTE sub-frame number. In some embodiments, the WWAN may comprise a cellular communications network such as a Long Term Evolution (LTE) network, and the WWAN time information may comprise a network broadcast GPS time and the corrected SPS time information may be determined based on the GPS time. In some embodiments, the WWAN may comprise a cellular communications network such as a CDMA2000 network where the network broadcast GNSS time information comprises GPS time, and the corrected SPS time information may be determined based on the GPS time.

In block 750, the corrected SPS time information for the current time determined in step 740 may be transmitted as SPS time assistance information 370 to one or more devices 210/UEs 100-*j* (i≠j) associated with UE 100-*i* over WPAN 260. In some embodiments, the WPAN may comprise a Bluetooth network; or a Near Field Communication (NFC) network or a Device to Device or Peer to Peer (P2P) communications network.

In some embodiments, the method may further comprise, determining based, in part, on the WWAN time information, corrected SPS time information for one or more times subsequent to the current time; and initiating transmission of the corrected SPS time information as SPS time assistance information 370 for the one or more times subsequent to the current time to the associated device over the WPAN.

In some embodiments, the method may further comprise initiating transmission of the corrected SPS time information/SPS assistance information 370 for the first time to the associated device 210/UE 100-*j* over the WPAN 260 based, in part, on a determination that: the associated device lacks WWAN access capability and/or access to WWAN timing information and/or WWAN availability. In some embodiments, the transmission of the corrected SPS time information/SPS assistance information 370 to device 210/UE 100-*j* for the current time may be triggered by one or more of: a request by the associated device 210/UE 100-*j* for the corrected SPS time information/SPS time assistance information 370 for the current time; an exchange of information between UE 100-*i* and an associated device 210/UE 100-*j* prior to the current time. For example, the communication may indicate a lack of WWAN capability/availability and SPS functionality on an associated device 210/UE 100-*j*, which may cause UE 100-*i* to initiate the transfer of corrected SPS time information 370. In some embodiments, the transmission of the corrected SPS time information/SPS assistance information 370 to device 210/UE 100-*j* for the current time may further be triggered by one or more of: an expiry of a time interval agreed upon by the UE 100-*i* and the associated device 210/UE 100-*j*; upon detection, by the UE 100-*i*, of a loss of connectivity to the WWAN.

Although the disclosure is illustrated in connection with specific embodiments for instructional purposes, embodiments are not limited thereto. Various adaptations and modifications may be made without departing from the scope. Therefore, the spirit and scope of the appended claims should not be limited to the foregoing description.

What is claimed is:

1. A method comprising:
    determining, at a UE, a Satellite Positioning System (SPS) time information associated with at least one SPS;
    propagating the SPS time information, at the UE, utilizing a Wireless Wide Area Network (WWAN) frequency reference;
    determining a propagated SPS time information for a first time based, in part, on the WWAN frequency reference and an SPS time correction, the propagated SPS time information to propagate the SPS time information to the first time; and
    initiating transmission of SPS timing assistance information to an associated proximate device over a Wireless Personal Area Network (WPAN), wherein the SPS timing assistance information comprises the propagated SPS time information for the first time.

2. The method of claim 1, wherein the determining the propagated SPS time information for the first time comprises:
    propagating the SPS time information based further on a Round Trip Time (RTT) communication delay between the UE and the associated device over the WPAN.

3. The method of claim 1, wherein determining the propagated SPS time information for the first time comprises:
    estimating, based on the WWAN frequency reference, a time uncertainty associated with the propagated SPS time information for the first time.

4. The method of claim 1, wherein the WWAN comprises a Long Term Evolution (LTE) network, the WWAN the frequency reference comprises a LTE System Frame Number (SFN) and a LTE sub-frame number, and determining the propagated SPS time information comprises:
    determining the propagated SPS time information based on the LTE SFN and the LTE sub-frame number.

5. The method of claim 1, wherein the WWAN frequency reference comprises network broadcast SPS time information.

6. The method of claim 5, wherein the WWAN comprises a Long Term Evolution (LTE) network and the network broadcast SPS time information comprises Global Positioning System (GPS) time, and determining the propagated SPS time information comprises:
    determining the propagated SPS time information based on the GPS time.

7. The method of claim 6, wherein the GPS time is provided as part of an LTE System Information Block (SIB), wherein the SIB comprises one of SIB8 or SIB16.

8. The method of claim 5, wherein the WWAN comprises a Code Division Multiple Access (CDMA2000) network and the network broadcast SPS time information comprises Global Positioning System (GPS) time, and determining the propagated SPS time information comprises:
    determining the propagated SPS time information based on the GPS time.

9. The method of claim 1, wherein the WPAN is one of:
    a Bluetooth network; or
    a Near Field Communication (NFC) network or
    a Device to Device communication network.

10. The method of claim 1, further comprising:
    determining based, in part, on the WWAN frequency reference, propagated SPS time information for one or more times subsequent to the first time; and
    initiating transmission of the propagated SPS time information for the one or more times subsequent to the first time to the associated proximate device over the WPAN.

11. The method of claim 1, wherein:
    initiating transmission of the propagated SPS time information for the first time to the associated proximate device is based, in part, on a determination that the associated proximate device lacks access to the WWAN.

12. The method of claim 1, wherein:
    initiating transmission of the propagated SPS time information for the first time to the associated device is triggered by one or more of:
    a request by the associated proximate device for the propagated SPS time information; or
    an exchange of information between the UE and the associated proximate device prior to the first time; or
    an expiry of a time interval agreed upon by the UE and the associated proximate device; or upon detection, by the UE, of a loss of connectivity to the WWAN.

13. A User Equipment (UE) comprising:
a Satellite Positioning System (SPS) receiver, the SPS receiver to receive a Satellite Positioning System (SPS) time information associated with at least one SPS;
a transceiver, the transceiver to receive, a Wireless Wide Area Network (WWAN) frequency reference; and
a processor coupled to the SPS receiver and the transceiver, wherein the processor is configured to:
propagate the Satellite Positioning System (SPS) time information utilizing the WWAN frequency reference;
determine a propagated SPS time information for a first time based, in part, on the WWAN frequency reference and an SPS time correction, the propagated SPS time information to propagate the SPS time information; and
initiate transmission of SPS timing assistance information to an associated proximate device over a Wireless Personal Area Network (WPAN), wherein the SPS timing assistance information comprises the propagated SPS time information for the first time.

14. The UE of claim 13, wherein to determine the propagated SPS time information for the first time, the processor is configured to:
propagate the SPS time information based further on a Round Trip Time (RTT) communication delay between the UE and the associated proximate device over the WPAN.

15. The UE of claim 13, wherein to determine the propagated SPS time information for the first time, the processor is configured to:
estimate, based on the WWAN frequency reference, a time uncertainty associated with the propagated SPS time information for the first time.

16. The UE of claim 13, wherein the WWAN comprises a Long Term Evolution (LTE) network, the WWAN the frequency reference comprises a LTE System Frame Number (SFN) and a LTE sub-frame number, and to determine the propagated SPS time information, the processor is configured to:
determine the propagated SPS time information based on the LTE SFN and the LTE sub-frame number.

17. The UE of claim 13, wherein the WWAN frequency reference comprises network broadcast SPS time information.

18. The UE of claim 17, wherein the WWAN comprises a Long Term Evolution (LTE) network and the network broadcast SPS time information comprises Global Positioning System (GPS) time, and to determine the propagated SPS time information, the processor is configured to:
determine the propagated SPS time information based on the GPS time.

19. The UE of claim 18, wherein the GPS time is provided as part of an LTE System Information Block (SIB), wherein the SIB comprises one of SIB8 or SIB16.

20. The UE of claim 17, wherein the WWAN comprises a Code Division Multiple Access (CDMA2000) network and the network broadcast SPS time information comprises Global Positioning System (GPS) time, and to determine the propagated SPS time information, the processor is configured to:
determine the propagated SPS time information based on the GPS time.

21. The UE of claim 13, wherein the WPAN is one of:
a Bluetooth network; or
a Near Field Communication (NFC) network or
a Device to Device communication network.

22. The UE of claim 13, wherein the processor is further configured to:
determine based, in part, on the WWAN frequency reference, propagated SPS time information for one or more times subsequent to the first time; and
initiate transmission of the propagated SPS time information for the one or more times subsequent to the first time to the associated proximate device over the WPAN.

23. The UE of claim 13, wherein the processor is configured to initiate transmission of the propagated SPS time information for the first time to the associated proximate device is based, in part, on a determination that the associated proximate device lacks access to the WWAN.

24. The UE of claim 13, wherein the initiation of transmission of the propagated SPS time information for the first time to the associated proximate device is triggered by the processor in response to one or more of:
a request by the associated proximate device for the propagated SPS time information; or
an exchange of information between the UE and the associated proximate device prior to the first time; or
an expiry of a time interval agreed upon by the UE and the associated proximate device; or
detection, by the UE, of a loss of connectivity to the WWAN.

25. A User Equipment (UE) comprising:
Satellite Positioning System (SPS) receiving means to receive a Satellite Positioning System (SPS) time information associated with at least one SPS;
transceiver means to receive, a Wireless Wide Area Network (WWAN) frequency reference;
means for propagating the Satellite Positioning System (SPS) time information utilizing the WWAN frequency reference;
means for determining a propagated SPS time information for a first time based, in part, on the WWAN frequency reference and an SPS time correction, the propagated SPS time information to propagate the SPS time information; and
means for initiating transmission of SPS timing assistance information to an associated proximate device over a Wireless Personal Area Network (WPAN), wherein the SPS timing assistance information comprises the propagated SPS time information for the first time.

26. The UE of claim 25, wherein means for determining the propagated SPS time information for the first time comprises:
means for propagating the SPS time information based further on a Round Trip Time (RTT) communication delay between the UE and the associated proximate device over the WPAN.

27. The UE of claim 25, wherein the means for initiating transmission of the propagated SPS time information for the first time to the associated proximate device is triggered by one or more of:
a request by the associated proximate device for the propagated SPS time information; or
an exchange of information between the UE and the associated proximate device prior to the first time; or
an expiry of a time interval agreed upon by the UE and the associated proximate device; or
upon detection, by the UE, of a loss of connectivity to the WWAN.

28. A non-transitory computer-readable medium may comprise instructions that are executable by a processor to:

determine, at a UE, a Satellite Positioning System (SPS) time information associated with at least one SPS;

propagate SPS time information at the UE, utilizing a Wireless Wide Area Network (WWAN) frequency reference;

determine a propagated SPS time information for a first time based, in part, on the WWAN frequency reference and an SPS time correction, the propagated SPS time information to propagate the SPS time information; and initiate transmission of SPS timing assistance information to an associated proximate device over a Wireless Personal Area Network (WPAN), wherein the SPS timing assistance information comprises the propagated SPS time information for the first time.

29. The computer-readable medium of claim 28, wherein the instructions to determine the propagated SPS time information for the first time comprise instructions executable by the processor to: propagate the SPS time information based further on a Round Trip Time (RTT) communication delay between the UE and the associated proximate device over the WPAN.

30. The computer-readable medium of claim 28, wherein the instructions to initiate transmission of the propagated SPS time information for the first time to the associated proximate device are triggered by one or more of:

a request by the associated proximate device for the propagated SPS time information; or an exchange of information between the UE and the associated proximate device prior to the first time; or an expiry of a time interval agreed upon by the UE and the associated proximate device; or upon detection, by the UE, of a loss of connectivity to the WWAN.

* * * * *